United States Patent [19]

Peterson

[11] Patent Number: 4,963,064
[45] Date of Patent: Oct. 16, 1990

[54] FABRIC FASTENER

[75] Inventor: Francis C. Peterson, Woodbury, Conn.

[73] Assignee: Buell Industries, Inc., Waterbury, Conn.

[21] Appl. No.: 449,591

[22] Filed: Dec. 12, 1989

[51] Int. Cl.⁵ .............................................. F16B 25/00
[52] U.S. Cl. .................................... 411/387; 411/416; 408/224
[58] Field of Search ................... 411/386, 387, 416; 408/213, 224, 228

[56] References Cited

U.S. PATENT DOCUMENTS

| 2,167,910 | 8/1939 | Rottenburg . | |
|---|---|---|---|
| 3,125,923 | 3/1964 | Hanneman . | |
| 3,438,299 | 4/1969 | Gutshall . | |
| 3,724,315 | 4/1973 | Sygnator . | |
| 3,786,713 | 1/1974 | Sygnator . | |
| 3,982,464 | 9/1976 | Sygnator . | |
| 4,028,987 | 6/1977 | Wilson . | |
| 4,069,730 | 1/1978 | Gutshall . | |
| 4,322,188 | 3/1982 | Hougen | 408/224 |
| 4,477,217 | 10/1984 | Bonacorsi | 411/387 |
| 4,486,135 | 12/1984 | Kazino | 411/387 |
| 4,534,690 | 8/1985 | Barth | 411/386 |
| 4,789,288 | 12/1988 | Peterson | 411/386 |

FOREIGN PATENT DOCUMENTS

| 2913482 | 10/1980 | Fed. Rep. of Germany . | |
| 231155 | 6/1925 | United Kingdom | 411/387 |
| 2127927 | 4/1984 | United Kingdom . | |

Primary Examiner—Neill R. Wilson
Attorney, Agent, or Firm—St. Onge Steward Johnston & Reens

[57] ABSTRACT

A fabric fastener adapted for fastening a fabric to a framework, or a workpiece to a fabric covered framework, comprises a head and shank, and a sharp edged tip section. The tip section has an unthreaded angle side which intersects a threaded side to form the sharp edge. Preferably two prongs with a space therebetween and sharp edges facing the space are formed at the end of the tip. The sharp edges, particularly of the prongs, serve to engage and cut through the threads of a fabric so that the fastener does not become entangled in the fabric, thereby minimizing damage to the fabric and also minimizing cross-threading with a framework aperture into which the fabric fastener is fastened.

11 Claims, 1 Drawing Sheet

FABRIC FASTENER

FIELD OF THE INVENTION

The present invention relates to a fabric fastener particularly adapted for use in fastening a fabric material to a framework or a workpiece to a fabric covered framework.

BACKGROUND OF THE INVENTION

Fabric materials such as upholstery and carpeting are used in automobiles, office furniture and in other applications. The fabric material is often secured to a framework by a threaded fastener which fastens to an aperture in the framework. In other instances it is necessary to mount a workpiece to the framework when the fabric material is already in place, covering the framework. For example, an armrest in a motor vehicle interior might be mounted to a fabric covered motor vehicle door. In both situations, the fabric material presents difficulties in fastening not ordinarily encountered in securing together bare metal parts. For example, if a hole has not been made in the fabric, the assembler must pierce the fabric with the fastener. Even if a hole is previously cut in the fabric, the threads in the fabric can become caught in the threaded fastener, which can unravel the fabric. The entangled fastener may also be moved out of alignment with the framework aperture, causing a frustrating hunt for the aperture, and/or causing the fastener to enter the aperture at an angle, causing cross-threading of the fastener in the aperture.

SUMMARY OF THE INVENTION

It is an object of the invention to provide a fastener having cutting edges particularly suitable to sever a fabric or sheet material so that the material does not become entangled with the fastener as it is threaded into a threaded aperture in a framework. It is a further object of the invention to provide a method of manufacturing such a fastener.

In accordance with the invention, a fabric fastener comprises: a fastener head; and a fastener shank, having an outer surface having threads formed thereon, and a tip section having a threaded side, an unthreaded angled side, and a sharp end formed by the intersection of the threaded and angled sides. The sharp end has cutting edges for cutting fabric or sheet material.

In its preferred embodiment, the sharp end cutting edges comprise at least two sharp prongs formed on the sharp end. The sharp prongs are sharp edged over at least their inner edges which face each other. A ridge is optionally included on the angled side of the tip section, and extends from adjacent the sharp prongs towards the threaded shank outer surface. The angle of the angled side relative to the shank axis is preferably between about 30° to about 60°, and is most preferably 45°.

The method of manufacturing the fabric fastener involves the steps of cold heading wire to form a fastener blank having a head and a generally cylindrical shank with an end; pinching the shank end of the fastener blank in an angled pinch pointing die to remove a portion of the shank end and form a fastener blank having a tip section with an angled side and two prongs at the shank end; and rolling threads on the blank by placing said blank between flat thread rolling dies and moving one or both said dies relative to the other.

Other objects, aspects and features of the present invention in addition to those mentioned above will be pointed out in or will be understood from the following detailed description provided in conjunction with the accompanying drawings.

DETAILED DESCRIPTION OF THE PREFERRED EMBODIMENT

Referring to FIGS. 1-5, a fabric fastener 20 which is particularly useful in fastening to a fabric covered framework is shown. As used herein "fabric" means any material incorporating a plurality of threads or filaments, and includes woven materials and non-woven materials, whether or not laminated with or backed by another material, for example, vinyl upholstery materials, fabric upholstery and carpeting. It is to be appreciated that the present invention is also useful for fastening in other applications using flexible materials such as leather, and that it could also be used in many other fastening applications. Fastener 20 comprises a head 22 and a shank 26. Head 22 is provided with suitable driving means, i.e. provided with a Phillips, hexagonal or other sockets to be engaged by a driving tool, or may be hexagonal to fit into a socket wrench, or otherwise adapted to be driven by manual or power tools. Head 22 is joined to shank 26, optionally by an unthreaded shoulder 24 as shown for applications such as attaching an armrest to a motor vehicle door. However, the shoulder 24 may be omitted, as the present invention is useful in many other applications.

Figure 1:
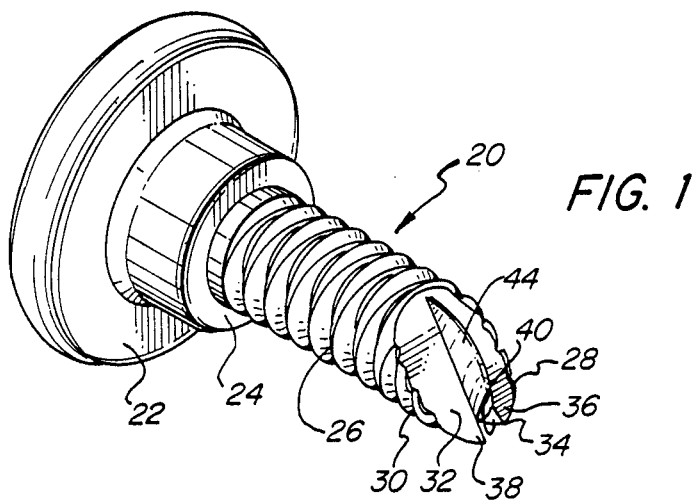
FIG. 1 is a perspective view of a fabric fastener in accordance with the invention.
Figure 2:
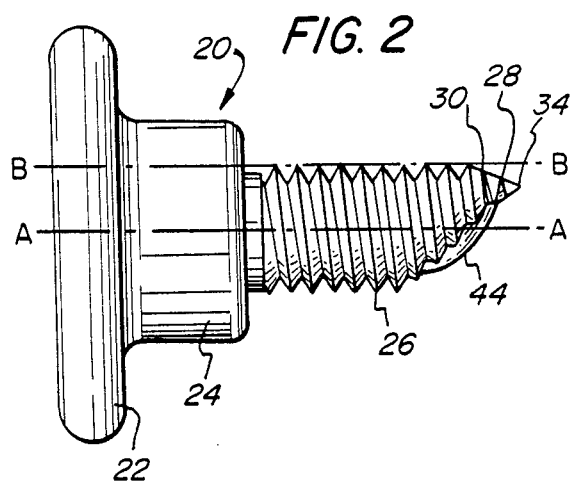
FIG. 2 is a side elevation view showing a fabric fastener in accordance with the invention.
Figure 3:
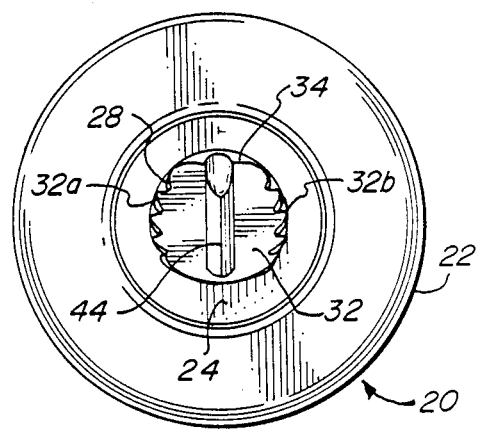
FIG. 3 is an end elevation view of the tip section of the fabric fastener of FIG. 2.
Figure 4:
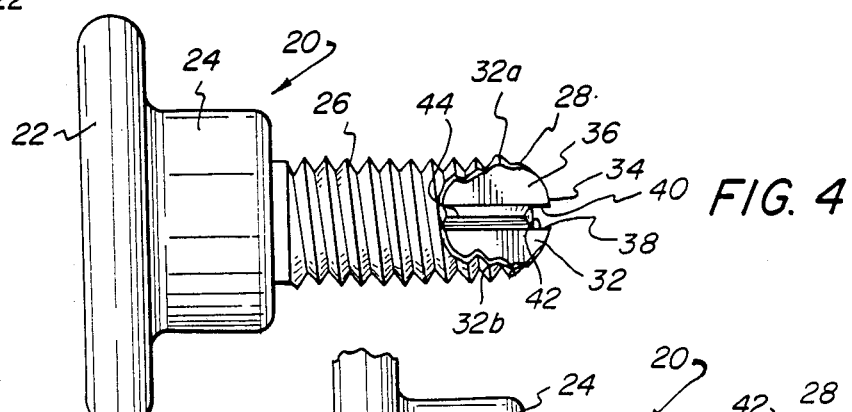
FIG. 4 is a bottom elevation view of the fabric fastener of FIG. 2.
Figure 5:
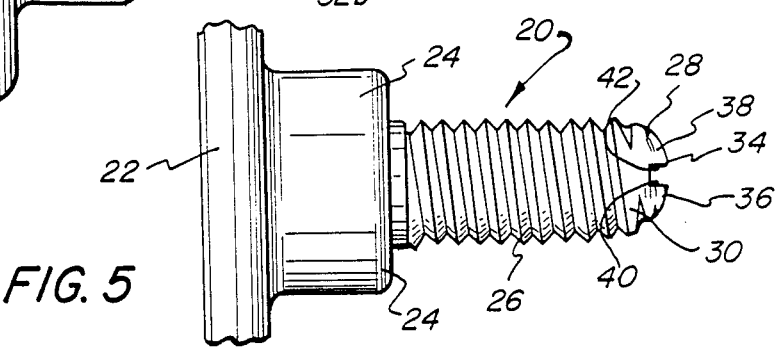
FIG. 5 is a top elevation view of the fabric fastener of FIG. 2.

Shank 26 has central axis A—A as shown in FIG. 2, and is threaded over most of its length. Tip section 28 is located at the end of the shank 26. Tip section 28 has a threaded side 30 and an unthreaded angled side 32. Threaded side 30 is contiguous with and substantially an extension of the threaded shank 26. Preferably the angled side 32 is generally flat, and intersects shank axis A—A at an angle of between about 30° to about 60°, and most preferably the angle of intersection is about 45°. It is to be appreciated however that angled side 32 may be concave, convex, or a combination of concave and convex surfaces, so long as the angle of intersection between the angled side 32 and threaded side 30 is sufficiently narrow as to provide a sharp edged end 34 at the end of tip section 28. In this respect, where the angled side 32 has an irregular surface, the intersection of the angled side 32 with the line B—B, which is parallel to axis A—A, and which is the line of the surface of the threaded shank 26 on the threaded side 30, should be in the same range, namely about 30° to about 60°, and most preferably 45°. As used herein, the axis of the shank is intended to refer to either of line A—A where the angled side is flat, or to the axis B—B if the angled side is irregular. As used herein "sharp" is meant to encompass an edge which is sufficiently thin or pointed so as to cut or pierce a fabric as defined herein, or its component threads or laminates.

Sharp end 34 will be provided with cutting edges for piercing and/or cutting a fabric or fabric threads.

Sharp end 34 has cutting edges which comprise at least one, and preferably at least two sharp prongs 36 and 38. Sharp prongs 36 and 38 are desirably sharp edged over at least their edges 40 and 42 which face each other, and most desirably are sharp edged over their entire perimeters. Edges 32a and 32b of the angled side 32 are also desirably sharp edged.

A ridge 44 is formed on the angled side 32. Ridge 44 extends from adjacent the sharp prongs 36 and 38 towards the outer surface of the threaded shank opposite the prongs 36 and 38, and is also preferably sharp edged.

Fabric fastener 20 is manufactured by the steps of cold heading steel wire in a conventional fastener die to form a fastener blank having a head and a generally cylindrical shank. The end of fastener blank is then pinched off in an angled pinch pointing die to remove a portion of the shank end. The pinch pointing die will typically comprise two die halves with pinching members extending toward each other. The pinching step forms a fastener blank having a tip section with an angled side. Two prongs are formed at the shank end during the pinching step as the pinched off end shears away from the blank along the line where the two parts of the pinch pointing die meet. A ridge may also form during the pinching step along the line where the two parts of the pinch pointing die meet. The ridge may be removed by grinding, if desired. Threads are then rolled onto blank by placing the blank between flat thread rolling dies and moving one or both the dies relative to the other. During the thread rolling step the tip section may tend to deflect toward the unsupported angled side 32 such that threaded side 30 is bent slightly radially inwardly, as shown in FIG. 2, so that threads on this side are less than fully developed. However this is not necessary to the function of the invention, and other methods of manufacturing may be used to arrive at the same product with more fully developed threads. For example, a standard fastener blank may be manufactured by cold heading wire in a die, threads rolled onto the fastener blank, and the end cut off by cutting means such as electric discharge machining in order to leave sharp edges on the tip section.

The fabric fastener of the present invention is very effective in the fastening of a fabric to a framework and/or a workpiece to a fabric covered framework. In particular the sharp edges of the fastener 20 are useful to pierce the fabric. The fastener, when rotated by a power tool, minimizes entangling of the fabric with the fastener by severing the fabric threads. For example, fabric will be caught in the space between prongs 36 and 38 and then severed by the sharp edges 40 and 42 of prongs 36 and 38. The outer edges of the prongs and angled side are also desirably sharp edged and also sever fabric threads which would entangle the fastener. This reduces the likelihood of damage to the fabric material through unravelling.

The fastener of the present invention minimizes incidence of cross-threading of the fastener into a framework threaded aperture, because the fastener severs entangling threads and resists being entangled in the fabric, which could move the fastener out of alignment with the framework aperture. In addition, the prongs 36 and 38 of fastener 20, when placed against a framework adjacent an aperture, allows the fastener end to "walk" across the framework when the fastener is rotated by a power tool, so that the fastener will easily find and thread into the aperture.

Accordingly, the present invention provides a new and useful fabric fastener. The foregoing description is illustrative of the invention, and may be subject to variations and adaptations all within the scope of the invention.

I claim:

1. A fabric fastener, comprising: a fastener head; and a threaded fastener shank having an axis, and
   a tip section having a threaded side and an angled side, the intersection of said threaded and angled sides forming an end,
   said threaded side being contiguous with and substantially an extension of the threaded shank,
   said end having two prongs with a space therebetween, said prongs having a perimeter with inner and outer edges, and being sharp edged over a substantial portion of their perimeters, including at least a portion of the edges of said prongs adjacent said space.

2. A fabric fastener in accordance with claim 1, wherein said angled side is unthreaded and intersects said shank axis at an angle of between about 30° to about 60°.

3. A fabric fastener in accordance with claim 2, wherein said angled side intersects said shank axis at an angle of about 45°.

4. A fabric fastener in accordance with claim 1, wherein said angled side has a perimeter edge, and wherein said angled side edge is sharp over a substantial portion of its length.

5. A fabric fastener, comprising:
   a fastener head; and
   a fastener shank, having threads formed thereon, and
   a tip section having a threaded side, an unthreaded angled side, and an end formed by the intersection of said threaded and angled sides, said threaded side being contiguous with said substantially an extension of the threaded shank, and said end having cutting edges for cutting a fabric, said end cutting edges comprising at least two prongs having inner edges facing each other and outer edges facing away from each other, in which at least the inner edges of said prongs are sharp.

6. A fabric fastener in accordance with claim 5, further comprising a sharp ridge formed on said angled side which extends from adjacent said prongs towards the opposite side of said threaded shank.

7. A fabric fastener in accordance with claim 5, wherein said shank has an axis, and wherein said angled side intersects said shank axis at an angle of between about 30° to about 60° such that said end is sharp edged.

8. A fabric fastener in accordance with claim 7, wherein said shank has an axis, and wherein said angled side intersects said shank axis at an angle of about 45°.

9. A fabric fastener in accordance with claim 5, wherein said outer edges of said prongs are sharp.

10. A fabric fastener in accordance with claim 9, wherein said angled side has a perimeter edge, and said edge is sharp over a substantial length thereof.

11. A fabric fastener, comprising:
    a fastener head; and
    a fastener shank, having threads formed thereon, and
    a tip section having a threaded side, an unthreaded angled side, and an end formed by the intersection of said threaded and angled sides, said threaded side being contiguous with and substantially an extension of the threaded shank, and said end having cutting edges for cutting a fabric, said end cutting edges comprising at least two prongs each having an inner edge, and outer edge and a prong end therebetween, said inner edges facing each other and said outer edges facing away from each other, said inner and outer edges and said prong end being sharp edged.

* * * * *